April 16, 1968     B. A. ARVIDSON     3,377,776
PACKAGE HANDLING EQUIPMENT
Filed April 29, 1965
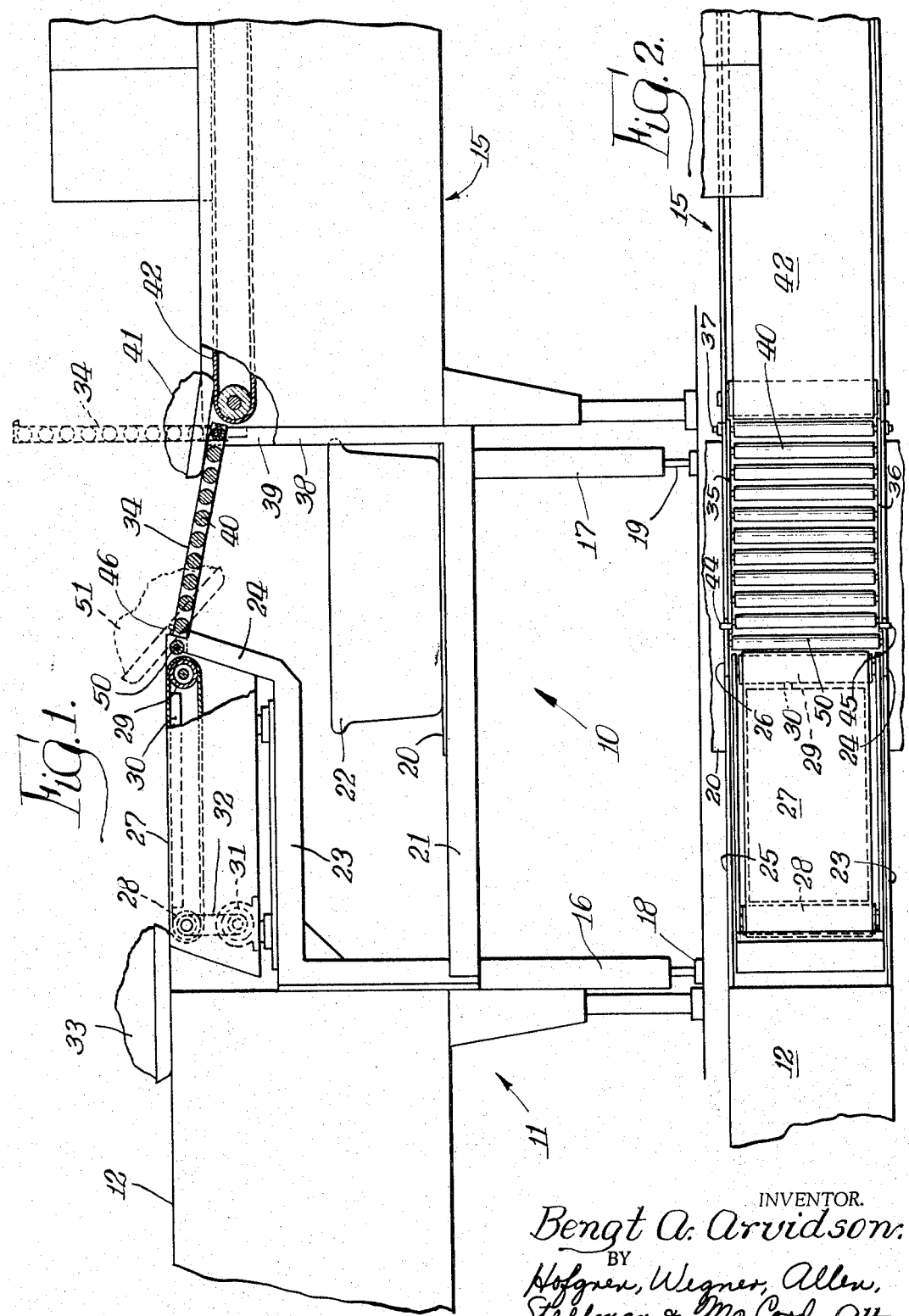
INVENTOR.
Bengt A. Arvidson.
BY
Hofgren, Wegner, Allen,
Stellman & McCord Attys.

United States Patent Office 3,377,776
Patented Apr. 16, 1968

3,377,776
PACKAGE HANDLING EQUIPMENT
Bengt A. Arvidson, Villa Park, Ill., assignor to Corley-Miller, Inc., a corporation of Ohio
Filed Apr. 29, 1965, Ser. No. 451,743
2 Claims. (Cl. 53—391)

ABSTRACT OF THE DISCLOSURE

A package handling step table having two levels, with a first level having a hot belt for sealing a package and a lower level for supporting a storage container, with a selectively usable conveyor positionable to cause a package to move from the step table to a succeeding mechanism without packages collecting in the container and with an additional conveying member functioning to cause pivoting of packages into the container without damage thereto.

---

This invention relates to a package handling step table and, more particularly, to such a table usable in combination with other equipment such as a wrapping counter and automatic package handling equipment.

An object of this invention is to provide new and improved package handling structure in which packages are conveyed along a direct line through successive handling operations or are caused to move to a storage location by simple shift of a gate member which also selectively functions as a conveying element.

Another object of the invention is to provide a package handling step table located between a wrapping station and automatic package handling equipment or the like in which the step table has means for completing the seal of a package and conveying structure for causing the package after completion of its sealing to move to the automatic handling equipment or, alternatively, move to a different level to fall into a suitable container supported at a different level on the frame of the step table.

A further object of the invention is to provide a package handling step table, as defined in the preceding paragraph, having supports at different levels, with a lower support positioned to support a package container and an upper support located above the level of the lower support and supporting the package sealing means.

An additional object of the invention is to provide a package handling step table having a first support adapted to support a container for holding packages, a second support at a higher level than the first support and offset therefrom, means on the second support for conveying packages therealong and a two-position conveyor having a first position in alignment with the package conveying means to receive packages therefrom and a second position, remote from the package conveying means, whereby a package moves off the latter and falls into a container on the first support and wherein the two-position conveyor, when positioned to receive packages, is inclined downwardly whereby packages move therealong by gravity and a roller is positioned at the end of the conveying means to function as a continuation of the conveying structure and as a package pivot when packages fall into the container when the two-position conveyor is moved to an inoperative position.

Further objects and advantages will become apparent from the following detailed description taken in connection with the accompanying drawings in which:

FIG. 1 is a side elevation view of the package handling step table in association with other package mechanisms and with parts broken away; and FIG. 2 is a plan view of the structure shown in FIG. 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The combination of structures is shown in the drawing in which a package handling step table, indicated generally at 10, is positioned between a table, indicated generally at 11, having a counter top 12 for use in hand wrapping packages and automatic package handling equipment, indicated generally at 15. The automatic handling equipment 15 can take different forms, with one example being an automatic indexer for obtaining desired timing and spacing between packages and of the type disclosed in an application of Arvidson and Treiber, Ser. No. 449,098, filed Apr. 19, 1965, now U.S. Patent No. 3,323,634. Alternatively, some other conveying mechanism can be substituted for the indexer to convey packages to a desired location.

The step table 10 has a frame with supporting legs, with the legs at one side thereof being shown at 16 and 17 and each having adjustable feet 18 and 19, respectively, whereby the step table 10 can be adjusted to a desired height. The frame includes a lower support platform 20 mounted on side supporting brackets, one of which is shown on the near side at 21. This support 20 is of a size to support a package receiving container or bin 22.

An upper support platform is defined by a pair of transversely-spaced brackets, with the bracket on the near side of the table being indicated at 23. Each bracket has an upstanding free end, as shown at 24, for the bracket 23. The other bracket 25 is shown in FIG. 2 and has the upstanding free end 26.

A hot belt 27 is supported on a suitable framework, supported by the upper platform, with the belt passing about guiding rollers 28 and 29 and over a heated plate 30. The guide roller 28 is driven from a motor and gear reducer unit 31 by means of a belt 32 passing about a drive pulley and a driven pulley drivingly connected to the roller 28. The hot belt 27 is at the level and at the end of the wrapping counter 12 whereby a package 33 can be wrapped initially, as by hand, and then placed on the hot belt 27 for sealing of the overlapped folds on the underside of the package. The hot belt 27 is driven at a relatively slow speed and, as the package progresses across the belt, the wrapping material is sealed.

A gate member is provided to determine the path of packages after leaving the hot belt 27. This gate member is shown in full line in FIG. 1 in operative position to convey packages from the hot belt 27 to the package handling unit 15. The gate member is also shown in broken line in inoperative position when it does not function to convey packages. This gate member 34 has a pair of side plates 35 and 36 which are pivotally-mounted on a shaft 37 mounted between a pair of spaced upright arms 38 and 39 of the frame of the step table. A series of guide rollers 40 extend between the plates 35 and 36 and the rollers are freely rotatable, whereby a package may move along the gate member. The rollers include a roller mounted on the pivot shaft 37 for the gate member. As shown in FIG. 1 in full line, the gate member 34, when in operative position, is inclined downwardly from the hot belt 27 whereby packages are caused to move therealong under the influence of gravity. As shown by the package 41 in FIG. 1, the package is conveyed by the gate member to a suitable conveying element 42 in the package handling unit 15.

The gate member 34 is held in operative position by outwardly-extending projections 44 and 45 on the side plates 35 and 36, respectively, which fit in notches 46 in the upper ends 24 and 26 of the brackets, as shown in FIG. 1. The gate member can be moved manually by clockwise pivoting movement about the pivot shaft 37 to the inoperative upright position shown in broken line in FIG. 1. In the latter position, the path of travel of packages is changed from having packages move to the handling unit 15 to a path in which the packages can fall from the hot belt 27 into the container 22, which is located by the step table in a position to receive the packages falling from the hot belt.

In order to prevent damage to the package wrapping film at the underside of the package, a roller 50 is rotatably-mounted in the bracket ends 24 and 26 and extends across and adjacent to the discharge end of the hot belt 27 and at the level thereof. The roller 50 serves as a pivot for the package 51, shown in broken line in FIG. 1, so the package 51 will lift, rather than slide off the hot belt 27, as it moves to the container 22, to thus prevent the hot belt from rubbing a hole in the package wrapping film. This could occur if the package 51 merely slid off the end of the hot belt in its travel to the container 22. This roller 50 also serves to provide continuity between the hot belt 27 and the gate member 34 when the gate member is in its operative position.

With the structure disclosed herein, a variation in operation can be provided simply. When packages are to run continuously to additional equipment, the gate member 34 can be lowered to its operative position and packages, as they are wrapped, will be conveyed to automatic handling equipment, such as package weighing and labelling structure. In the event packages are not to be further handled at that time or if a package is of a size that it cannot go through further automatic equipment, the gate member 34 can be moved to its inoperative position whereby packages can simply fall from the hot belt into a container which is always properly located beneath and beyond the end of the hot belt as provided by the construction of the step table.

I claim:

1. A package handling step table comprising, a frame, a lower support platform on said frame, an upper support platform partially overlying said lower support platform, a package sealing hot belt on said upper support platform having a discharge end overlying said lower support platform whereby a package may fall from said belt to a container on the lower support platform, a gate member in the form of a conveyor pivotally mounted on said frame at an elevation beneath the level of said hot belt, said gate member having a first operative position inclined downwardly from said hot belt to convey packages therealong under the influence of gravity and a second inoperative position remote from said hot belt to permit package movement from the hot belt to a container, and a roller on said frame extending across the discharge end of the hot belt to function either as a continuation of said gate member or as a package pivot when the gate member is in said inoperative position and cause the package trailing portion to elevate away from the hot belt as the package leading portion moves toward the container.

2. In combination, a wrapping counter, a step table positioned adjacent said counter, a hot plate supported by said table, a traveling hot belt on said table for receiving a package from the counter and sealing the bottom thereof while the package moves along the belt over said hot plate, an automatic package handling unit spaced a distance from the hot belt, a conveyor spanning said distance between the hot belt and said unit for conveying packages to said unit, means mounting said conveyor for bodily movement to an inoperative location, a container on said table located beneath an end of the hot belt for receiving packages therefrom when said conveyor is in said inoperative location, a roller mounted adjacent and spaced from said end of the hot belt forming a support between the hot belt and said conveyor and alternatively a pivot for a package moving toward the container when said conveyor is in said inoperative location to cause the package to lift off the belt as the package starts to descend toward the container and avoid sliding of the package on the hot belt.

References Cited
UNITED STATES PATENTS

| | | | |
|---|---|---|---|
| 2,883,033 | 4/1959 | Armstrong et al. | 198—31 |
| 2,904,943 | 9/1959 | Dreyfus et al. | 53—184 X |
| 2,981,399 | 4/1961 | Parker | 198—31 |
| 3,031,823 | 5/1962 | Zebarth | 53—391 |

TRAVIS S. McGEHEE, *Primary Examiner.*